UNITED STATES PATENT OFFICE.

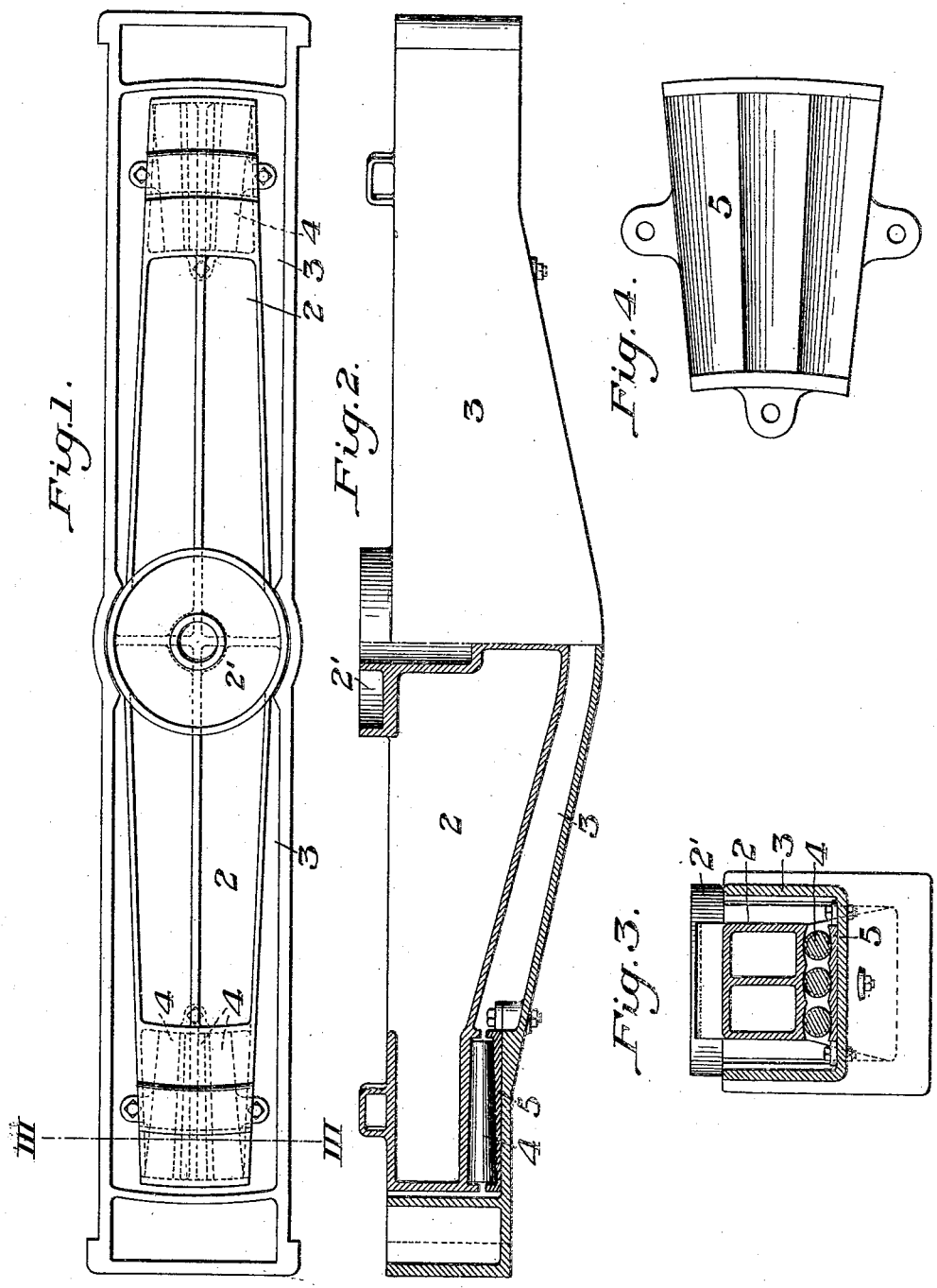

JACOB J. BYERS, OF CAMERON, MISSOURI, ASSIGNOR TO THE NATIONAL MALLEABLE CASTINGS COMPANY, OF CHICAGO, ILLINOIS, A CORPORATION OF OHIO.

TRUCK-BOLSTER.

939,946.  Specification of Letters Patent.  Patented Nov. 9, 1909.

Application filed January 27, 1909. Serial No. 474,435.

*To all whom it may concern:*

Be it known that I, JACOB J. BYERS, of Cameron, Clinton county, Missouri, have invented a new and useful Improvement in Truck-Bolsters, of which the following is a full, clear, and exact description, reference being had to the accompanying drawings, forming part of this specification, in which—

Figure 1 is a plan view of my improved construction; Fig. 2 is a side elevation partly in vertical section; Fig. 3 is a vertical cross section on the line III—III of Fig. 1; and Fig. 4 is a plan view of the roller bearing plate.

My invention relates to truck bolsters for cars, and has for its object to provide a bolster which will allow the car truck to pass around curves without the usual binding effect between the truck and the car which is incident to constructions heretofore used. I accomplish this object by means of a bolster made in two parts which are capable of a relative horizontal swinging motion. One of these parts supports the load transmitted thereto by the body bolster resting thereon, while the other part transmits the load to the truck and is supported by the truck. Preferably I make one of these parts of a bath tub or coffin form, within which the other part is set, sufficient clearance being provided between the members to permit the horizontal radial or swinging motion thereof.

As shown in the drawing, the load supporting the bolster member 2 is placed within an outer member 3 of the ordinary bathtub or coffin type, which is adapted to be supported at its ends upon the side members of the truck frame with springs in any usual or suitable manner. The inner member has a central bearing 2' which bears at its sides within the member 3 and at its upper face is adapted to receive the center bearing of the body bolster; and at its outer ends the member 2 preferably bears upon conical or tapered rollers 4, set upon a plate 5 at the bottom of the outer bolster member 3. Sufficient clearance is left between the sides of the members 2 and 3 to permit a limited radial horizontal motion so that the bolster itself will have a swinging movement in rounding curves, the ends of the upper member of the bolster moving on the rollers. With the constructions which have been used heretofore, in passing around curves the weight of the car often presses to such an extent upon the side bearings of the truck as to prevent the proper radial motion between the truck and car body and thus to lift the wheels at one side of the truck from the track. This is prevented by my invention which is therefore of importance and materially increases the durability of the car.

The construction may be modified in many ways by those skilled in the art for the form of the bolster and other parts may be changed without departing from the spirit and scope of my invention.

I claim:—

1. A truck bolster comprising two members, capable of a relative horizontal swinging motion, one of said members having means for supporting it on a car truck, and the other member having a bearing for a body bolster; substantially as described.

2. A truck bolster comprising a member having means for supporting it on a car truck, and a second member supported on the first named member, and having a bearing for a body bolster; said members being capable of a limited, radial, horizontal motion relatively to each other independently of the movement of the body bolster; substantially as described.

3. A car truck having a bolster formed with a member bearing on the truck and a second load supporting member, mounted upon the other member to swing horizontally about its center independently of the movements of the car truck, the second load supporting member having thereon bearings for a body bolster; substantially as described.

4. A truck bolster comprising a lower member arranged to be supported on a car truck, and an upper member of less length than the lower member, and having bearings within the lower member to permit a limited radial, horizontal, relative movement of the two members, said upper member having bearings for a body bolster; substantially as described.

5. A truck bolster comprising a lower member arranged to be supported on a car truck, and an upper member of less length than the lower member, and having central and end bearings within the lower member to permit a limited radial, horizontal, relative movement of the two members; substantially as described.

6. A truck bolster comprising an upper member and a lower member, the upper member having a central rotary bearing on the lower member, and also having movable end bearings on said lower member, said upper member also having bearings for a body bolster and arranged to move horizontally with respect to the lower member to prevent binding between the truck bolster and the body bolster; substantially as described.

In testimony whereof, I have hereunto set my hand.

JACOB J. BYERS.

Witnesses:
  WALTER L. GRAVES,
  A. O. BUCKINS, Jr.